United States Patent Office 2,882,016
Patented Apr. 14, 1959

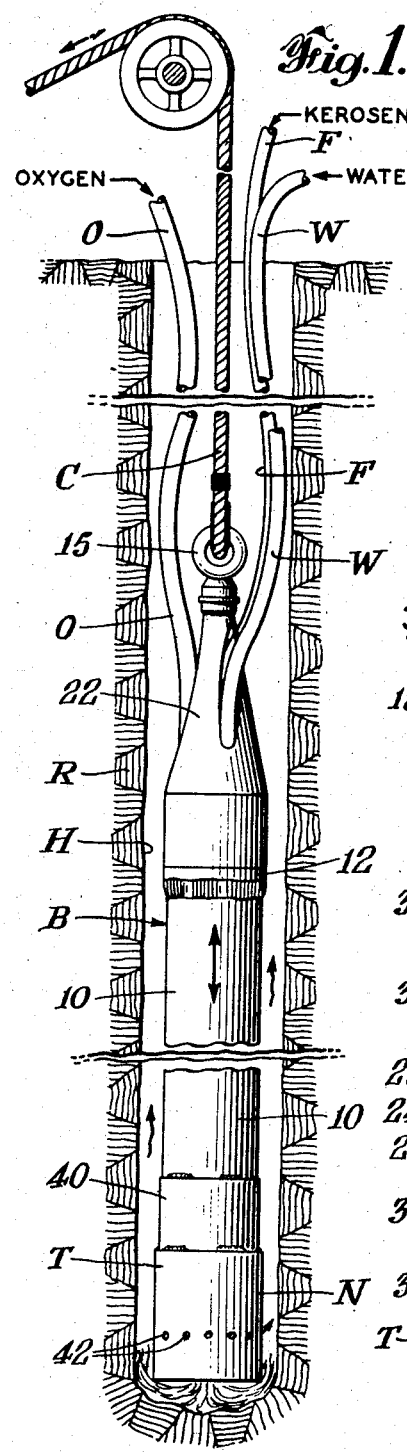
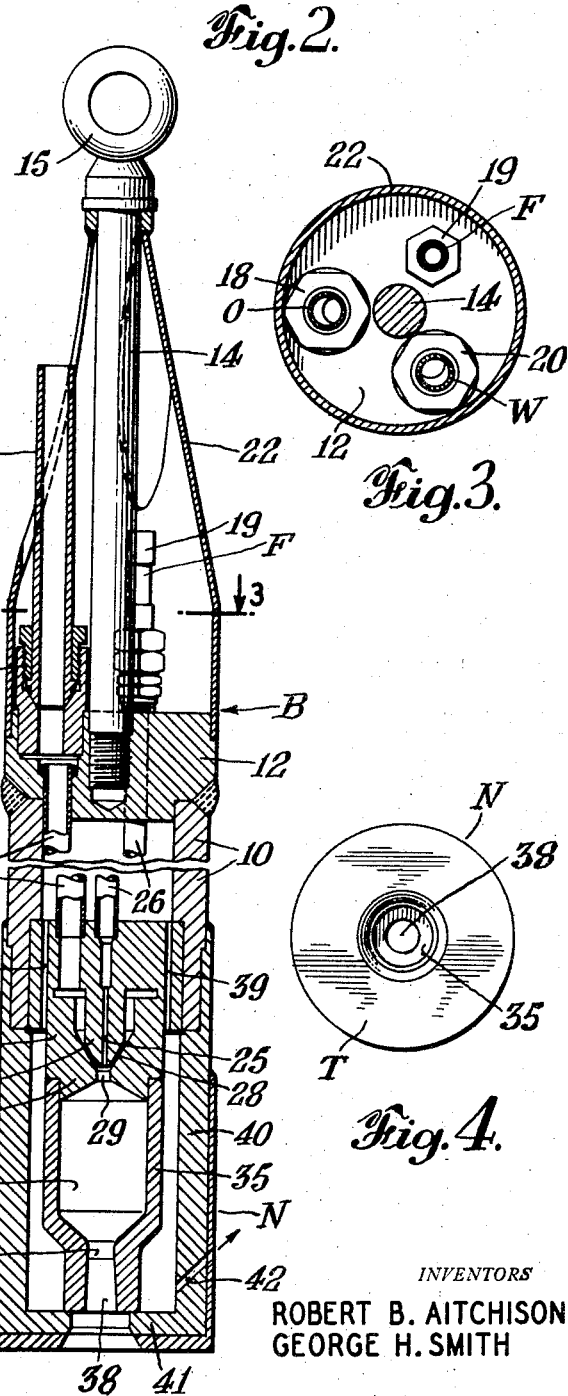
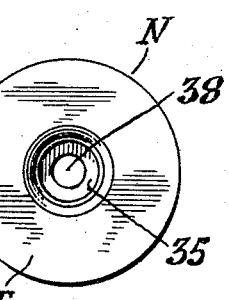

2,882,016

THERMAL MINERAL PIERCING EMPLOYING A FREE SUSPENSION BLOWPIPE

Robert B. Aitchison, New York, and George H. Smith, Kenmore, N.Y., assignors to Union Carbide Corporation, a corporation of New York Application May 19, 1953, Serial No. 355,998

13 Claims. (Cl. 255—1.8)

The present invention relates to thermal mineral piercing method and apparatus therefor, including an oxy-fuel blowpipe.

The expense and slowness of mechanical drilling of mineral bodies are such that it has been proposed to employ an oxy-fuel blowpipe for piercing holes in minerals of a heat spallable nature, such as quartzite and the like. The blowpipe is positioned to direct oxy-fuel flames against the mineral thereby spalling off successive portions of the mineral. As particles are removed in this manner, the blowpipe is fed into the hole that is formed in the body of the mineral. In this manner, holes have been produced in mineral bodies to depths of greater than thirty feet.

Heretofore, method and apparatus such as is disclosed in U.S. Patents 2,327,496 and 2,327,498 to C. J. Burch have been employed to pierce such holes. The Burch invention requires that inlet means for separately supplying fuel, oxidant and cooling water to the blowpipe, and connections for supporting and manipulating the blowpipe, be located at the surface of the mineral body to be pierced. This, in turn, requires the use of a blowpipe having a length greater than the depth of the hole to be pierced. The limitations of such method and apparatus are instantly apparent and, while such procedure has proven very successful in piercing holes of relatively shallow depth, it has proven costly, difficult and cumbersome when it is desired to pierce holes of great depth in bodies of rock. In addition, the height of the tower required to handle such long blowpipe, in feeding it into and retracting it from the pierced hole, has presented great difficulties.

Accordingly, it is the major object of the present invention to provide a method and apparatus for thermal piercing of mineral bodies wherein the size of the apparatus is greatly reduced and wherein efficiency and piercing speed are consequently increased.

A further object is to provide process and apparatus which increases the speed and force with which particles of detritus, spalled off from the mineral body, are ejected from the hole during the piercing operation.

A still further object is to provide a blowpipe not requiring a cumbersome lifting tower for directing it into, and withdrawing it from, the hole to be pierced.

Other objects and advantages of the present invention will be apparent from the following description and accompanying drawing, in which:

Fig. 1 is a view of a section taken through a pierced hole in a mineral body, also showing in elevation an oxy-fuel blowpipe in accordance with the present invention with the fluid connections and supporting structure lowered into the hole to a point below the surface thereof;

Fig. 2 is a vertical sectional view of the blowpipe shown in Fig. 1;

Fig. 3 is a sectional view of the blowpipe taken along the line 3—3 of Fig. 2; and Fig. 4 is a bottom view of the same blowpipe.

In accordance with the present invention, a blowpipe providing a relatively high velocity oxy-fuel jet flame is positioned to direct flame against the mineral body to be pierced. The thermal action of the flame causes a spalling of the mineral body which separates material therefrom to form a hole. The blowpipe is continuously advanced into the hole and concurrently reciprocated along its vertical axis while steadily advancing into the pierced hole.

The reciprocation stroke is preferably of the order of about 3 to 8 inches between top and bottom, and is performed at a frequency of the order of about 25 to 65 cycles per minute. The reciprocating action is coordinated with an advancement of the blowpipe into the hole so that both actions take place concurrently.

At intervals the blowpipe may be allowed to touch the bottom of the hole (at the bottom of a stroke) for indexing purposes, so that it may be assured that the entire reciprocating stroke employed is in the most efficient piercing range of blowpipe flame distance to work.

A cooling fluid such as water is introduced into the region of the flame whereupon it quenches and solidifies any fused mineral material thereby keeping it from running to the bottom of the hole and puddling there. The exposure of this cooling fluid to the intense localized heat of the flame and adjacent area causes volatilization of the fluid which continually passes up and out of the hole with the gaseous products of combustion.

Detritus, formed by spalling off particles from the mineral body, are ejected from the hole by the rising gaseous products of combustion and vaporized cooling fluid.

It has been found that the reciprocating action of the blowpipe in accordance with the method of the present invention, increases the efficiency and speed of ejecting detritus from the hole. This reciprocating action produces a pumping effect on these gases which accounts for the increased efficiency and speed of ejection.

Additionally, the reciprocating action increases the over-all efficiency and speed of the piercing operation. This is due to the fact that at all times during piercing, the blowpipe and, consequently, the flame jet, is maintained within the range of most efficient distance from the bottom of the hole being pierced.

Referring to the drawings in general, the blowpipe B is shown in process of piercing a hole H in mineral material R. The blowpipe B is suspended by a cable C which extends down into the hole H and is connected to the streamlined top or rear end of the blowpipe B. The lower end of the blowpipe B has a nozzle N for projecting oxy-fuel flames against the material R at the bottom of the hole H. Oxidizing gas is supplied by a flexible hose O which extends down into the hole H and is connected to the top of the blowpipe B. Fluid fuel is supplied by another flexible hose F, and particle ejecting fluid is supplied by a third flexible hose W, both extending down into the hole H and connected to the rear end of the blowpipe. The nozzle N is surrounded by hard metal sleeve T.

Referring more particularly to the drawings, the blowpipe B comprises a metal body tube 10 having its upper end closed by a plug 12 welded thereto. A supporting rod 14 is screwed into the plug 12, and terminates in an eye 15 for attachment to the cable C. The plug 12 is bored to provide fluid passages respectively fitted with a nipple 18 for the oxygen hose O, a nipple 19 for the fuel hose F and another nipple 20 for the water hose W.

The supporting rod 14 and the three nipples are located inside the greatest diameter of the blowpipe, and are enclosed by a cone 22 connecting the top of the plug 12 and the eye 15, suitably cut away to receive the respective hoses for the nipples, and forming a streamlined tail for the blowpipe to prevent its being caught on irregularities in the hole when reciprocated in the pierced hole.

A suitable burner is mounted at the bottom of the blowpipe, preferably of the oxy-fuel internal combustion type, and in the preferred embodiment shown by way of example, the lower end of the body 10 is closed by an injector 23 which has a conical insert 24 provided with a central bore 25 connected by a tube 26 with the nipple 19 for the fluid fuel, and forming a fuel injection nozzle. The lower portion 27 of injector 23 is fitted over the fuel nozzle 24 and has a conical inner wall spaced therefrom to form a conical oxygen passage 28 terminating in a restricted throat 29. The passage 28 is connected by a tube 30 with the nipple 18 for the oxidizing gas.

The injector 23 extends beyond the end of the tube 10, and joins a flame tip member 35 which forms therewith a substantially cylindrical combustion chamber 36. Beyond the chamber 36, the flame tip member 35 is sharply restricted to form a throat 37 and therebeyond slightly flared toward the exit to form a flame nozzle 38.

The fuel, such as relatively inexpensive kerosene, is injected at high pressure greater than 15 pounds per square inch gauge through the bore 25 into the combustion chamber inside the flame tip 35. The oxidizing fluid such as gaseous oxygen is concurrently but separately delivered at high pressure greater than 15 pounds per square inch gauge to the conical passage 28. The fuel and oxygen mix intimately together in passing through throat 29, and the mixture burns vigorously in chamber 36 at a combustion pressure greater than 15 pounds per square inch gauge, producing flaming combustion gases which pass through the discharge throat 37 and the flaring passage 38 to provide an axially directed flame jet.

The cooling water from the nipple 20 fills the space inside the body tube 10 and outside of the tubes 26 and 30. From this space, the cooling water passes through bores 39 in the injector 23 outside of the oxygen nozzle 27.

Secured to the bottom of the tube 10 outside of the injector 23 is a strengthening head formed by a sleeve 40, which extends beyond the bottom of the flame tip member 35. The lower end of the sleeve 40 has an internal flange 41 which engages the flared portion 38 of the flame tip member 35. The space between the flame tip member 35 and the sleeve 40 receives water from the drillings 39. The sleeve 40 has upwardly inclined bores 42 through which water and/or resultant steam are discharged to eject spalled particles from the hole. The sleeve 40 thus forms a strengthening head, as well as an outer wall for the cooling jacket and a nozzle for the particle ejecting fluid.

In the operation of the blowpipe in piercing a hole, the blowpipe B is reciprocated by the cable C, the reciprocation being continued all of the time that the blowpipe is being lowered. It has been found that the reciprocating action of the blowpipe produces an alternate compression and expansion of the products of combustion thereby producing a pumping action which aids in more speedily ejecting detritus from the hole.

A reciprocation frequency of about 25 to 65 cycles per minute has been found to be preferable, but not found to be critical to the satisfactory performance of the method of the present invention.

Similarly, a reciprocation stroke of about 5 inches has been found to be preferable when employing an oxy-kerosene flame in a 6 inch diameter blowpipe. It is, of course, to be understood that for a different fuel mixture or diameter blowpipe, a correspondingly different reciprocation stroke will be preferred.

The steady reciprocating motion coupled with a slow steady advance of the blowpipe has been found to provide piercing speeds greater than were obtainable with blowpipes employed heretofore, both of the rotating and non-rotating types. For example, a body of granite has been pierced to a depth of greater than 115 feet, in accordance with the present invention, at a piercing rate of greater than 45 feet per hour employing a 6 inch diameter blowpipe, an oxy-kerosene fuel flame, a reciprocating rate of 45 cycles per minute, and a reciprocation stroke of 5 inches. Common piercing speeds realized prior to the present invention were in the neighborhood of 20–30 feet per hour with a similar flame in granite.

Additionally, it has been found that less oxygen and fuel consumption is required to pierce a hole to a given depth than heretofore due to the more efficient employment of the flame in its most efficient distance from the bottom of the hole. This has been accomplished, as described hereinabove, by periodically indexing the position of the flame with reference to the bottom of the hole where the piercing is continually progressing.

It is, of course, to be understood that when a collar of an easily fused and plugged material is encountered, the blowpipe may be retracted and then again advanced, without an interruption of the reciprocating action, until such collar is removed and the normal forward piercing operation can be resumed.

This is a continuation-in-part of application Serial No. 47,214, filed September 1, 1948, and issued on November 16, 1954, as U.S. Patent 2,694,550.

We claim:
1. A method of thermally piercing mineral bodies with a blowpipe to produce an elongated passage in such bodies comprising directing oxy-fuel flames from said blowpipe against the mineral body to separate material therefrom, removing said separated material, progressing said flames as the separation of said material increases to form a hole, advancing said blowpipe into said hole while axially reciprocating said blowpipe, and thereafter continuing said axial reciprocation of said blowpipe while steadily advancing said blowpipe into said hole.

2. A method in accordance with claim 1 wherein the removal of said separated material in aided by the alternate compression and expansion of exhaust gases accomplished by the reciprocating action of said blowpipe.

3. A method in accordance with claim 1 wherein said blowpipe is reciprocated at a frequency of approximately 25–65 cycles per minute.

4. A method in accordance with claim 3 wherein a reciprocation stroke of about 5 inches is employed using a 6 inch diameter blowpipe and an oxy-kerosene flame.

5. A method in accordance with claim 1 wherein said blowpipe is periodically contacted with the bottom of said hole at the bottom of a stroke for indexing purposes thereby providing that the reciprocating action of said flame occurs in the most efficient range of distance from flame to bottom of hole.

6. A method of thermally piercing mineral bodies with a blowpipe to produce a substantially vertical elongated passage therein comprising directing oxy-fuel flame from said blowpipe against the mineral body to separate material therefrom, removing said separated material, progressing said flames as the separation of said material increases to form a hole, advancing said blowpipe into said hole while axially reciprocating said blowpipe by alternately allowing it to fall by gravity and then retracting it, and thereafter continuing said axial reciprocation while steadily advancing said blowpipe into such hole at a rate correlated with the rate of piercing of said hole.

7. A method in accordance with claim 6 wherein the removal of said separated material is aided by the alternate compression and expansion of exhaust gases accomplished by the reciprocating action of said blowpipe.

8. A method in accordance with claim 6 wherein said blowpipe is reciprocated at a frequency of approximately 25–65 cycles per minute.

9. A method in accordance with claim 8 wherein a reciprocation stroke of about 5 inches is employed using a 6 inch diameter blowpipe and an oxy-kerosene flame.

10. A method in accordance with claim 6 wherein said blowpipe periodically contacts the bottom of said hole at the bottom of a stroke for indexing purposes thereby providing that the reciprocating action of said flame occurs in the most efficient range of distance from flame to bottom of hole.

11. In the art of thermally piercing mineral bodies by directing oxy-fuel flame from a blowpipe against said body to separate material therefrom by spalling and removing said separated material therefrom to form an elongated passage, the improvement which comprises thermally piercing said mineral body by directing said flame from a freely-suspended blowpipe, and advancing said blowpipe into said elongated passage while axially reciprocating said blowpipe at a frequency of between approximately 25 and 65 cycles per minute to pierce a substantially vertical elongated passage in said body to a depth greater than the length of said blowpipe.

12. The method of thermally piercing mineral bodies with a flame blowpipe to produce a substantially vertical elongated passage in such bodies to a depth greater than the length of said blowpipe comprising, directing oxy-fuel flame from said blowpipe against said mineral body to separate material therefrom, removing said separated material, progressing said flame as the separation of said material increases to form a substantially vertical passage, advancing said blowpipe into said passage while axially reciprocating said blowpipe, and thereafter continuing said axial reciprocation of said blowpipe while steadily advancing said blowpipe into said passage to form an elongated passage having a depth greater than the length of said blowpipe.

13. The method of thermally piercing mineral bodies with a flame blowpipe to produce a substantially vertical elongated passage in said bodies to a depth greater than the length of said blowpipe comprising, directing oxy-fuel flame from said blowpipe against said mineral body to separate material therefrom, removing said separated material, progressing said flame as the separation of said material increases to form a substantially vertical passage, advancing said blowpipe into said passage while axially reciprocating said blowpipe at a frequency between about 25 and 65 cycles per minute and with a stroke of between about 3 inches and 8 inches, and thereafter continuing said axial reciprocating of said blowpipe while steadily advancing said blowpipe into said passage to form an elongated passage having a depth greater than the length of said blowpipe.

References Cited in the file of this patent

UNITED STATES PATENTS

| | | |
|---|---|---|
| 1,047,625 | French | Dec. 17, 1912 |
| 2,327,482 | Aitchison et al. | Aug. 24, 1943 |
| 2,327,498 | Burch | Aug. 24, 1943 |
| 2,471,695 | McCullough | May 31, 1949 |